United States Patent [19]
Heindel et al.

[11] Patent Number: 5,417,558
[45] Date of Patent: May 23, 1995

[54] INJECTION MOLDING UNIT FOR INJECTION MOLDING MACHINES

[75] Inventors: Friedrich Heindel, Baden; Harald Bleier, Neustadt; Richard Müssler, Steinbrunn, all of Germany

[73] Assignee: Battenfeld Kunstoffmaschinen Ges.m.b.H, Kottingbrunn, Germany

[21] Appl. No.: 81,991

[22] Filed: Jun. 23, 1993

[30] Foreign Application Priority Data

Jun. 23, 1992 [DE] Germany .......... 42 20 445.3
Dec. 11, 1992 [DE] Germany .......... 42 41 819.4

[51] Int. Cl.⁶ ............................................. B29C 45/80
[52] U.S. Cl. ............................. 425/145; 264/40.7; 425/150
[58] Field of Search ............ 425/145, 149, 150; 264/40.7

[56] References Cited

U.S. PATENT DOCUMENTS

| | | | |
|---|---|---|---|
| 3,887,170 | 6/1975 | Heindl | 259/191 |
| 3,914,630 | 10/1975 | Lloyd et al. | 310/61 |
| 4,693,676 | 9/1987 | Inaba | 425/145 |
| 4,828,473 | 5/1989 | Otake et al. | 425/145 |
| 4,934,341 | 6/1990 | Otsuka et al. | 123/41.31 |
| 5,129,808 | 7/1992 | Watanabe et al. | 425/145 |

Primary Examiner—Tim Heitbrink
Attorney, Agent, or Firm—Anderson Kill Olick & Oshinsky

[57] ABSTRACT

An injection molding unit for injection molding machines includes a first subassembly having a plasticizing unit including a screw cylinder and a screw, a second subassembly having a metering drive to rotate the screw of the plasticizing unit, a third subassembly having two drives with substantially parallel axes for providing motion of the screw cylinder relative to an injection mold, and a fourth subassembly having two drives with substantially parallel axes for producing actual displacement of the screw in the screw cylinder of the plasticizing unit, with the plasticizing unit being located substantially centrally between the two parallel axes of the third and fourth subassembly drives, and with the two drives of said fourth sub-assembly include two liquid-cooled electric servomotors, respectively, electrically connected to one another to operate synchronously.

18 Claims, 2 Drawing Sheets

INJECTION MOLDING UNIT FOR INJECTION MOLDING MACHINES

FIELD OF THE INVENTION

The present invention deals with an injection molding unit for injection molding machines having a modular structure comprising several subassemblies.

BACKGROUND OF THE INVENTION

Injection molding units for injection molding machines are, of course, already known (see, e.g., EP-B1-0 266 655 and AT-Brochure "CD plus Battenfeld Austria", Page 16). Such injection molding units for injection molding machines have provided good results because the modular construction permits adapting an injection molding machine to the respective production program and the tooling stock.

All three drive subassemblies of the known injection molding units are laid out for hydraulic operation, which makes it necessary either to equip each individual injection molding machine with a hydraulic pressure generation installation or to connect it, at the very least, to a central hydraulic pressure agent supply source.

It is therefore an object of the invention to provide an injection molding unit for injection molding machines which permits reduced drive expenditures for the injection molding machines and which results in a more compact over-all construction.

Another object of the invention is to provide an injection molding unit for injection molding machines wherein heat energy carried away by the water as a cooling medium from the electric servomotors can be recovered and used for tempering the tooling, thereby increasing overall efficiency of injection molding machine and saving energy costs.

A further object of the invention is to provide an injection molding unit for injection molding machines, which is particularly suitable when used under clean space conditions because the electric servomotors cannot produce any undesirable air emissions.

SUMMARY OF THE INVENTION

These and other objects of the invention, which shall become apparent hereafter, are achieved by an injection molding unit for injection molding machines, comprising a first subassembly comprising a plasticizing unit having a screw cylinder and a screw, a second subassembly formed by a metering drive for the screw of the plasticizing unit, a third subassembly comprising two drives operating along parallel axes with respect to each other for actuating the nozzle motion between the plasticizing unit and the injection molding unit, a fourth subassembly having two drives operating with axes parallel to each other for producing, in the form of an axial displacement, the injection motion of the screw in the screw cylinder of the plasticizing unit which is located centrally between the two parallel axes drives of the third and fourth subassembly.

The invention achieves a more compact over-all construction by at least the two drives having parallel axes of the fourth subassembly of the modular construction equipped with a liquid cooled electric servomotors, wherein the servomotors are connected to each other to operate synchronously.

The use of an electric servo motor for producing the injection motion of the screw in the screw cylinder of the plasticizing unit proposed by the invention results in a higher operating accuracy. The injection process and the quality of the molded parts resulting therefrom can therefore be considerably improved. The use of liquid cooling furthermore permits the use of electric servomotors having a high power output density which thus have a compact, space-saving construction.

A particularly advantageous and expedient layout is achieved in the injection molding unit per the invention if, in addition to the two drives of the fourth subassembly, two drives of the second subassembly and the drive of the third subassembly is also equipped with liquid cooled electric servomotors.

Such construction facilitates more accurately the movement of an injection molding unit than with conventional use of hydraulic drives. Furthermore, the overall costs for manufacturing an injection molding machine can be minimized, since no hydraulic pressure generation installation is required. Rather, each individual drive can be supplied directly by the common user electric network. In the latter case, the best results are achieved if all electric servomotors are three phase synchronous or AC synchronous motors.

Additionally, improved results are achieved if each liquid cooled electric servomotor is connected with its drive through step-down elements. The step-down elements of the drives for the third and the fourth subassembly can be formed by threaded spindles and associated nuts and assures space accurate transmission of the drive motion and also helps save space.

If the step-down elements of the drive of the second subassembly comprises a planetary gear train, located upstream of the screw of the plasticizing unit constituting the first subassembly, a space saving, compact construction of an injection molding unit in the invention can be achieved. Further space saving construction of the entire injection molding unit would occur if the electric servomotor of the third (and preferably also the electric servomotor of the fourth) subassembly are equipped with hollow shafts per the invention, including the drive nut which is penetrated by the threaded spindle. Furthermore, equipping the electric servomotor with a hollow shaft yields the advantage that at least a corresponding partial length of the threaded spindle belonging to the respective drive can be temporarily housed in a space saving manner along the entire constructional length of the motor in order to minimize the overall construction length of the injection molding unit.

If the effective axis of the drives for the third and fourth subassembly are in alignment with each other and the two drive of the third subassembly having parallel axes as well as the two drives of the fourth subassembly having parallel axes engage at a lateral yoke or at a cross tie, the two lateral yokes or cross ties are displaceable by their drives relative to the screw cylinder of the plasticizing unit belonging to the first subassembly.

It is also possible in the invention that each drive of the fourth subassembly comprises a threaded rolling spindle or ball screw spindle coupled non-rotationally to the shaft of the electric servomotor. The spindle is in an actuation engagement with a threaded rolling nut or a ball screw nut located in the lateral yoke or in the cross tie.

The threaded spindle of each drive of the third subassembly can, in the invention, engage non-rotationally at the associated lateral yoke or cross tie with interposition of an energy accumulator. This makes it possible to switchoff the current to the electric servomotor of the third subassembly in the course of every injection process and yet reliably to assure the contact force of the injection nozzle against the molding tool or mold.

Additionally, the two ends of the plasticizing units constituting the first subassembly lie between the two lateral yokes or cross tie and all drives of the third and fourth subassembly, together with the plasticizing unit of the first subassembly, have a common base between these lateral yokes or cross ties.

The plasticizing unit constituting the first subassembly, together with its screw cylinder, is supported to be swivelable around an approximately horizontal lateral axis between the drives of the third and the fourth subassembly and its screw, is in entrainment or drive connection through a removable clutch with the drive of the second subassembly seated at the lateral yoke or cross tie of the fourth subassembly. It is also important for the normal operation of the injection molding unit that a transmitter system for the position and velocity control be coupled with each electric servomotor and that the second and third subassemblies rest to be longitudinally displaceable on stationary linear guidance elements of the common base.

BRIEF DESCRIPTION OF THE DRAWINGS

The invention will be better understood by the Detailed Description of the Preferred Embodiment, in connection with the drawings, of which.

DETAILED DESCRIPTION OF THE PREFERRED EMBODIMENT

Figure 1:
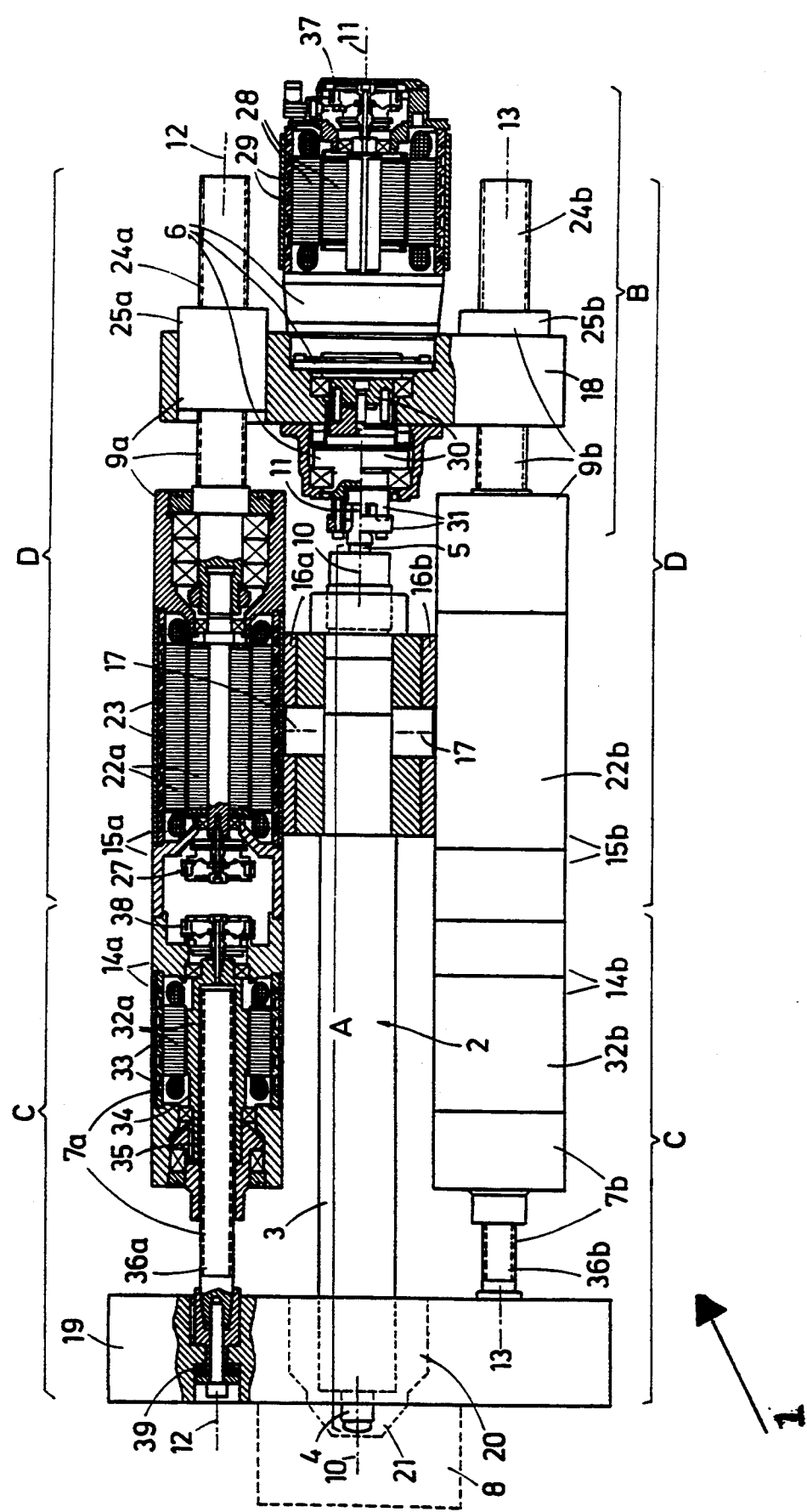
FIG. 1 is a partially plan and partially horizontal longitudinal sectional view of an injection molding unit for a molding machine having a modular construction comprising four different subassemblies, wherein the plasticizing unit constituting the first subassembly is provided with three different drive subassemblies.

Referring now to the drawings, wherein like numerals reflect like elements, throughout the various views, FIG. 1 depicts, partially in plan and partially in horizontal longitudinal sectional view, an injection molding unit 1 for an injection molding machine have a modular construction. The injection molding unit 1 can therefore comprise several different subassemblies, wherein one may select among several individual components in each subassembly which are combinable in a random faction and may be matched to each other in order to obtain equipment suitable for a particular manufacturing program and the available tooling.

A preferred embodiment of an injection molding unit 1, shown in FIG. 1, comprises of four subassemblies A, B, C, and D. A plasticizing unit 2 of the injection molding unit's first subassembly A, comprises a screw cylinder 3 with the forwardly directed injection nozzle 4 and a screw 5 rotatably supported therein and projecting rearwardly from the second subassembly B, is formed by the metering drive 6 of the screw 5 of the plasticizing unit 2. The metering drive can be coupled with the end of the screw 5 projecting in the rearward direction from the screw cylinder 3.

Two completely identical drives 7a and 7b (see FIG. 2), operating along two parallel axes exist as a third subassembly C, producing the relative motion of the injection nozzle 4 fed by plastics melt from the plasticizing unit 2 relative to an injection tool or mold 8. Note that only one tool half is outlined by dotted lines in the drawing.

Two drives 9a and 9b, working along axes parallel to each other belong against the fourth subassembly D producing the injection motion of the screw 5 in the screw cylinder 3 of the plasticizing unit 2 as an axial displacement.

As also seen in FIG. 1, the plasticizing unit 2 (thus the first subassembly A) of the injection molding unit 1 is located centrally between the two parallel axis drives 7a and 7b of the third subassembly C, as well as 9a and 9b. As depicted, longitudinal axis 10—10 of the subassembly A or the plasticizing unit 2 is disposed in its normal effective position to be in exact alignment with longitudinal axis 11—11 of the subassembly B or of the metering drive 6. The longitudinal axis 10—10 of the subassembly A or of the plasticizing unit 2 extends parallel to the two longitudinal axes 12—12 and 13—13, which have the drives 7a and 9a or 7b and 9b of the two subassemblies C and D in common.

Figure 2:
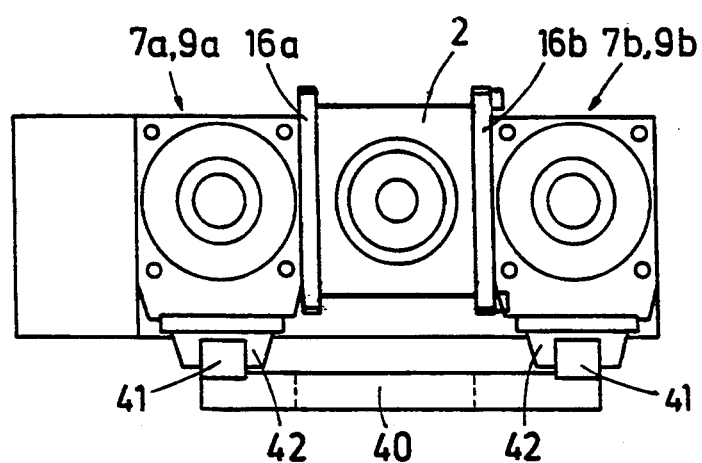
FIG. 2 depicts the injection molding unit of FIG. 1, viewed in direction of arrow II.

As further evident from FIG. 2, each drive 7a and 7b of the subassembly C sits in a housing 14a or 14b. Each drive 9a and 9b of the subassembly D sits in a housing 15a and 15b. Housings 14a and 15a, as well as housings 14b and 15b, are in fixed connection with each other respectively. Furthermore, a fixed connection of the housing 15a and 15b with the support cheeks 16a and 16b, respectively is provided. Subassembly A or the plasticizing unit 2 is held to be swivelable in the cheeks around the horizontal lateral axis 17—17.

An essential component of both the second subassembly B and the fourth subassembly D is a lateral yoke or a cross tie 18, while a similar lateral yoke or a cross tie 19 belongs to the third subassembly C.

The lateral yoke or the cross tie 18 is always located behind the end of the screw 5 projecting rearwardly from the screw cylinder 3 of the plasticizing unit 2. Meanwhile, the lateral yoke or the cross tie 19 are allocated to the injection nozzle 4 of the plasticizing unit 2 or the screw cylinder 3 and form the support of one-half of the injection tool or mold 8. A recess or passage 20 is located in the lateral yoke or in the cross tie 19, through which the injection nozzle 4 of the plasticizing unit 2 can be guided against the gate or sprue 21 of the injection tool 8 and can be pressed against the same.

At least the two drives 9a and 9b of the fourth subassembly D of the injection molding unit are equipped with an electric servo motor 22a or 22b having a high power density. These electric servo motors 22a and 22b are laid out as alternating current or AC motors and are provided with liquid cooling 23 to facilitate compact construction, despite its high power output density. Both electric servo motors 22a and 22b drive a threaded spindle 24a or 24b directly, which is preferably designed as a ball screw spindle, as well as being in permanent engagement with a drive nut 25a or 25b which, in this case, is a ball screw nut. Both drive nuts 25a and 25b are housed in the lateral yoke or in the cross tie 18, which forms the carrier or support for the second subassembly D of the injection mold unit 1 and therefore are the metering drive It is important that the two electric servo motors 22a and 22b of the fourth subassembly D of the injection molding unit 1 be in synchronous connection so that they can cause an accurate displacement motion of the lateral yoke or the cross tie 18 with the second subassembly B or the metering drive 6 carried by the lateral yoke by the simultaneously and uniformly rotating threaded spindles 24a and 24b.

In the depicted injection molding unit 1, the threaded spindles 24a and 24b, designed as ball screw spindles of the drives 9a and 9b, are connected with the rotor of the associated electric servo motor 22a or 22b to be non-rotatable thereto and project with their threaded segment continuously beyond the end of a bearing housing. The threaded segment penetrates the lateral yoke of the cross tie 18 and the drive nuts 25a and 25b located therein and in such a way that the lateral yoke or the cross tie 18 can displace themselves along the threaded segments of the threaded spindles 24a and 24b if the threaded spindles 24a and 24b are made to rotate.

Each electric servo motor 22a and 22b is coupled to a transmitter system 27, with its end facing away from the threaded spindles 24a and 24b, by means of which an exact position and velocity control for the fourth subassembly D of the injection molding unit 1 can be assured.

However an analog travel measuring system, for instance in the form of a linear potentiometer, can be used for the exact position velocity control of the fourth subassembly D of the injection molding unit 1 instead of the above-mentioned transmitter system 27 which can be affected if necessary by the motion of the threaded spindles 24a or 24b.

As can be seen from FIG. 1, the metering drive 6 of the second subassembly B of the injection molding unit 1 is also equipped with an electric servo motor 28 which is liquid cooled 29, so that it can be constructed in a compact arrangement in view of its high power output density.

This electric servo motor 28 is flanged to the rear side of the lateral yoke or the cross tie 18 and drives a planetary gear train 30 as a step-down unit, which is partially housed in the lateral yoke or the cross tie 18 and which partially projects forwardly beyond the lateral yoke.

A clutch 31 is located on the drive side of this planetary gear train 30, enabling coupling of the end of the screw 5, projecting beyond the screw cylinder 3 of the plasticizing unit 2 selectably to the metering drive 6 of the second subassembly B or to disconnect it. After disconnecting the clutch 31, the entire plasticizing unit 2 can, at least to a limited extent, be swiveled around the horizontal lateral axis 17—17 so that the free end of the screw 5 can then be removed from the effective area of the clutch 31. This last step however is possible only after the lateral yoke or the cross tie 19 of the third subassembly C of the injection molding unit 1 has been moved so far towards the front or towards the left-hand side by its drive 7a and 7b that the injection nozzle or tie 4 of the plasticizing unit 2 has been completely released by the lateral yoke or the cross tie 19.

The drives 7a and 7b of the third subassembly C or the injection molding unit 1 are also constructed as electric servo motors 32a and 32b having a high power output density and are therefore equipped with liquid cooling 33. The rotors of these two electric servo motors 32a have a hollow shaft 34 forming or containing a drive nut 35 with which one threaded spindle 36a or 36b is in permanent engagement.

Each of the two threaded spindles 36a and 36b is anchored at the lateral yoke or cross tie 19 of the third subassembly C of the injection molding unit 1 to be non-rotational thereto. The rotation of the hollow shafts 34 or the drive nuts 35 or both electric servo motors 32a and 32b results in an axial displacement of the two appropriate threaded spindles 36a and 36b and to a corresponding displacement of the lateral yoke or the cross tie 19 relative to the plasticizing unit 2 forming the first subassembly A of the injection molding unit 1. It is self-evidently important in the case of the third subassembly C of the injection molding unit 1 that the two electric servo motors 32a and 32b are connected to operate synchronously with each other so that a perfect angularly correct displacement of the lateral yoke or the cross tie is assured. The type of construction involving hollow shafts of the servo motors 32a and 32b operating with liquid cooling 33 facilitates fabrication of the third subassembly of the injection molding unit 1 with a minimum constructional length.

It is also possible, if necessary, to use the electric servo motors 22a and 22b equipped with liquid cooling 23 of the fourth subassembly D of the injection molding unit 1 with the hollow shaft type of construction if it is important to assure a minimum construction length. In this case, the threaded spindles 24a and 24b should also be connected to the lateral yoke or the cross tie 18 to be non-rotational thereto and the drive nuts 25a and 25b should then be removed from the lateral yoke or the cross tie 18 and be integrated into the hollow shafts of the electric servo motors 22a and 22b.

FIG. 1 shows that the electric servo motor 28 of the metering drive 6 of the second subassembly B is also coupled to a transmitter system 37 for the position and velocity control. The electric servo motors 32a and 32b of the third subassembly C of the injection motor unit 1 also contains a transmitter system 38 for the position and velocity control.

Naturally analog travel measuring systems such as linear potentiometers can be used for the position and velocity control for the second subassembly B and the third subassembly C of the injection molding unit 1, instead of transmitter system 37.

All the electric servo motors 22a, 22b, 28a, 32a, 32b are preferably three-phase synchronous or AC synchronous motors. So that the entire injection molding unit 1 can be directly supplied from the commonly available electric network and therefore must not be equipped with an additional pressure generation installation. It is furthermore advantageous in this type of injection molding unit 1 that the drives of the three subassemblies B, C and D, operating with electric servo motors, assure higher operating precision and thereby enable creation of an injection molding machine by means of which molded parts of the highest quality can be manufactured.

As seen in FIG. 1, the two threaded spindles 36a and 36b of the drives 7a and 7b, belonging to the third subassembly C of the injection molding unit 1, engage at the lateral yoke or the cross tie 19, each with interposition of one force accumulator 39. This arrangement renders it possible to switch the powers of the electric servo motors 32a and 32b after the injection nozzle 4 of the plasticizing unit 2 has been applied to the gate or sprue aperture 21 of the injection mold 28, while the injection process of the plastics melt into the mold cavity of the injection mold 8 occurs by the electric servo motors 22a and 22b of the subassembly D. The contact force of the injection nozzle 4 is maintained by the force accumulator 39 if the current has been removed from the electric servo motors 32a and 32b.

An injection molding unit 1 of modular construction from different subassemblies A, B, C and D where all drives 6, 7a, 7b, 9a, 9b are equipped with an electrical servo motor 28, 32a, 32b, 22a, 22b which permits the operation of several motion sequences in a controlled manner and thereby optimize the operating mode of the entire injection molding unit 1.

As shown in FIG. 2, the plasticizing unit 2 of the first subassembly A is positioned centrally between the drives 7a, 9a and 7b, 9b of the third subassembly C and the fourth subassembly D and all drives 7a, 7b, 9a, 9b of this third and fourth subassembly C and D, together with the plasticizing unit 2 of the first subassembly A have a common base 40 on the injection molding machine which is not shown here. It is a further expedient to equip the common stationary base 40 with linear guide elements 41 on which the third and fourth subassembly C, D rest in common, so as to be longitudinally displaceable by claw-like guide shoes 42. The plasticizing unit 2 is also indirectly pivotally supported by the common stationary base 40 through the support cheeks 16a and 16b and the horizontal lateral axis 17—17 engaging into these. The second subassembly B of the injection molding unit 1 is also indirectly abutted on this stationary base 40 through the threaded spindles 24a and 24b, as well as the lateral yoke or the cross tie 18.

Using electric servomotors for all drives of the injection molding unit 1 permits operation with minimum constructional sizes. Furthermore, through the use of liquid-cooled electric servomotors for all drives, very high torques are available from a dead start, which has a favorable effect upon the operating mode of the entire injection molding unit 1.

The injection molding unit 1 has two common aligned (with each other) effective axes 12—12 and 13—13 for its third and fourth subassemblies C and D, which are symmetrical to the first and second subassemblies A and B. This provides the advantage that, with simultaneous operation of drives 7a and 7b or 9a and 9b, no moments, which would have to be carried by the common base 40 through the linear guide elements 41 and the guide shoes 42, can occur.

The linear guide elements 41 and the guide shoes of the common stationary base 40 however enable operation only with those drives in certain cases which are disposed in one of the two effective axes 12—12 or 13—13. In this case, the occurring moments are carried by the linear guides.

Since electric servomotors 32a, 32b or 22a with the same characteristic data are used as drives 7a, 7b or 9a, 9b in both effective axes 12—12 and 13—13, a correspondingly variable operational mode of the injection molding unit 1 is possible, depending on whether the drives in only one or both effective axes 12—12 or 13—13 are utilized.

Finally it would also be conceivable to build an injection molding unit 1 with four effective axes with an electric servomotor provided in each of the third and fourth subassemblies C and D.

While the preferred embodiment of the invention has been disclosed in detail, modifications and adaptions may be made thereto, without departing from the spirit and scope of the invention, as delineated in the following claims.

What is claimed is:

1. An injection molding unit for injection molding machines having modular construction, comprising:
 a first subassembly comprising a plasticizing unit formed by a screw cylinder and a screw;
 a second subassembly comprising a metering drive to rotate the screw of the plasticizing unit;
 a third subassembly comprising two drives, having axes substantially parallel to one another, for providing motion of the screw cylinder relative to an injection mold; and
 a fourth subassembly comprising two drives, having axes substantially parallel to one another, for producing actual displacement of the screw in the screw cylinder of the plasticizing unit, wherein the plasticizing unit is located substantially centrally between the two parallel axes of the third and fourth subassembly drives;
 wherein said two drives of said fourth sub-assembly includes two liquid-cooled electric servomotors, respectively, to produce said actual displacement of the screw in the screw cylinder, and wherein said electric servomotors are electrically connected to one another to operate synchronously.

2. The injection molding unit of claim 1, wherein said metering drive of said second subassembly and said two drives of said third subassembly include each a liquid-cooled electric servomotor, and wherein the liquid-cooled electric servomotors of said two drives of said third subassembly are electrically connected to one another to operate synchronously.

3. The injection molding unit of claim 2, wherein said liquid-cooled electric servomotors of said metering drive of said second subassembly and of said two drives of said third subassembly are three-phase AC-synchronous electric motors.

4. The injection molding unit of claim 2, wherein each liquid-cooled electric servomotor comprises a liquid cooling means for cooling a respective electric servomotor, each electric servomotor being connected to step-down means of a respective drive for transmitting motion to the respective drive.

5. The injection molding unit of claim 2, wherein said two drives of said third subassembly and said two drives of said fourth subassembly each comprise step-down means for connecting said two drives of each subassembly with a respective electric servomotor, each step-down means including a threaded spindle and a corresponding nut.

6. The injection molding unit of claim 1, wherein said metering drive of said second subassembly comprises a step-down means for connecting said metering drive of said second subassembly to a respective electric servomotor and, said step-down means having a planetary gear train.

7. The injection molding unit of claim 5, wherein the liquid-cooled electric servomotors of said two drives of said third subassembly each comprise a hollow drive shaft equipped with a drive nut cooperating with a respective threaded spindle of a respective step-down means for counting said two drives with the respective electric servomotors.

8. The injection molding unit of claim 7, wherein the liquid-cooled electric servomotors of said two drives of said fourth subassembly comprise each a hollow drive shaft equipped with a drive nut cooperating with a respective threaded spindle of the respective step-down means.

9. The injection molding unit of claim 8, wherein effective axes of said two drives of said third subassembly and effective axes of said two drives of said fourth subassembly are aligned with each other, respectively.

10. The injection molding unit of claim 1, further comprising two cross-ties, said two drives of said third subassembly and said two drives of said fourth subassembly engaging a respective one of said two cross-ties, whereby said two cross-ties are displaceable by respective drives relative to said screw cylinder of said plasticizing unit.

11. The injection molding unit of claim 10, wherein each of said two drives of said fourth subassembly comprises a ball screw spindle fixedly coupled to a shaft of a respective electric servomotor, and wherein the respective one of said two cross-ties comprises a ball screw nut located in said respective one of said two cross-ties cooperating with a respective ball screw spindle.

12. The injection molding unit of claim 10, wherein each of said two drives of said third subassembly comprises a threaded spindle, and wherein said injection molding unit further comprises a force accumulator which provides for a fixed connection of the threaded spindles to the respective one of the two cross-ties.

13. The injection molding unit of claim 10, wherein said plasticizing unit extends between said two cross-ties, and wherein said two drives of said third subassembly and said two drives of said fourth subassembly have a common base with said plasticizing unit, said common base being located between said two cross-ties.

14. The injection molding unit of claim 13, wherein said plasticizing unit is pivotally supported on said common base between said two drives of said third subassembly and said two drives of said fourth subassembly for pivotal movement about a horizontal lateral axis, wherein said metering drive of said second subassembly is arranged on a cross-tie associated with said fourth subassembly, and wherein said injection molding unit further comprises a disengageable clutch connecting said screw of said plasticizing unit with said metering drive.

15. The injection molding unit of claim 2, comprising a transmission system for each of the electric servomotor for controlling position and speed of a respective electric servomotor.

16. The injection molding unit of claim 13, wherein said common base has stationary linear guide means for supporting said third and fourth subassemblies for joint linear displacement therealong.

17. The injection molding unit of claim 15, wherein each transmission system comprises an analog path-measuring system.

18. The injection molding unit of claim 17, wherein said analog path measuring system comprises a linear potentiometer.

* * * * *

UNITED STATES PATENT AND TRADEMARK OFFICE
CERTIFICATE OF CORRECTION

PATENT NO. : 5,417,558

DATED : MAY 23, 1995

INVENTOR(S) : FRIEDRICH HEINDL, et al.

It is certified that error appears in the above-indentified patent and that said Letters Patent is hereby corrected as shown below:

On the title page items [19], [75], and [73], should read:

[19] HEINDL, et al.

[75] Inventors: Friedrich Heindl, Baden; Harald Bleier, Neustadt; Richard Müssler, Steinbrunn, all of Austria

[73] Assignee: Battenfeld Kunststoffmaschinen Ges.m.b.H, Kottingbrunn, Austria

Signed and Sealed this

Twenty-third Day of January, 1996

Attest:

BRUCE LEHMAN

Attesting Officer     Commissioner of Patents and Trademarks